May 8, 1928.

A. KATZINGER

REENFORCED BAKING PAN

Original Filed Oct. 4, 1926

1,669,057

Arthur Katzinger,
Inventor.

Attorney.

Patented May 8, 1928. 1,669,057

UNITED STATES PATENT OFFICE.

ARTHUR KATZINGER, OF CHICAGO, ILLINOIS, ASSIGNOR TO EDWARD KATZINGER COMPANY, OF CHICAGO, ILLINOIS.

REENFORCED BAKING PAN.

Application filed October 4, 1926, Serial No. 139,482. Renewed March 26, 1928.

This invention relates to pans used for baking bread, cake and similar articles and is employed ordinarily by the wholesale bakeries although obviously the same construction can be used for domestic cooking purposes and for many other purposes, some of which are mentioned herein.

The object of this invention is to provide a strong, durable and simple sanitary baking pan and one which will give greater life and more generally satisfactory results than others now on the market.

This invention aims to provide a maximum of strength and durability with a minimum of expense. Other objects will be apparent from the description and drawings attached hereto.

Figure 1:
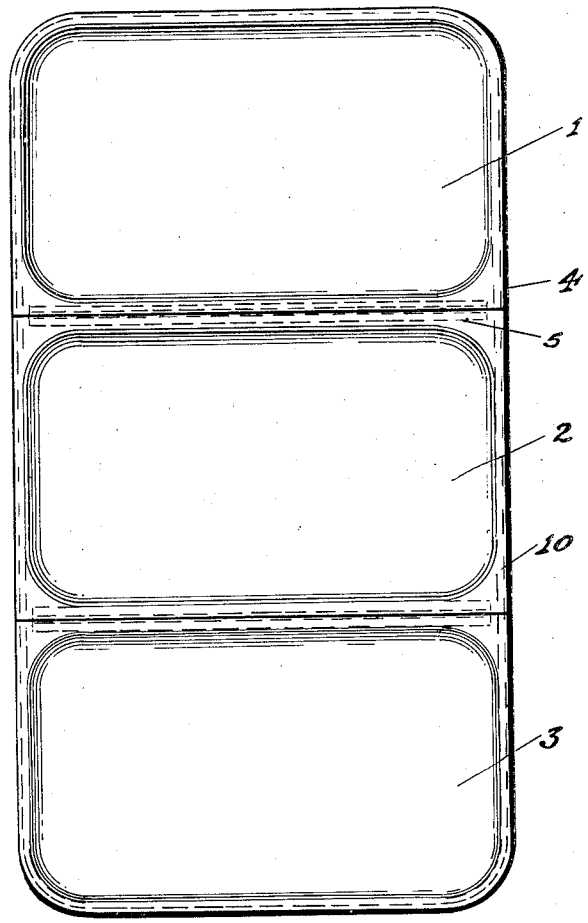
Figure 4:
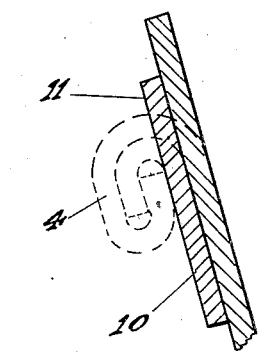
Figure 5:
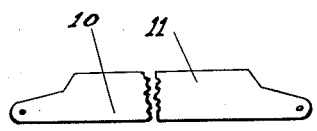
Figure 2:
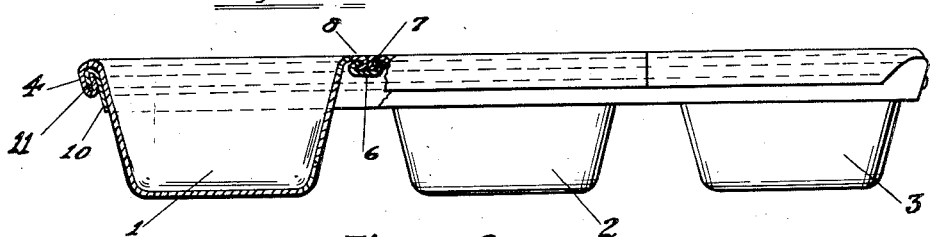
Figure 3:
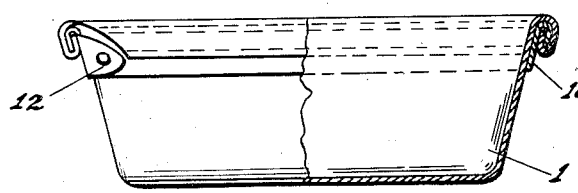

Referring to the drawings, Figure 1 shows a plan view of a series of three pans attached together in a unit in accordance with my invention. Figure 2 shows a side elevation partly in section, while Figure 3 shows an end elevation also in section. Figure 4 shows a detail of the construction by which the flanges of the pans are engaged with the surrounding strap later to be described and is an enlargement of the corresponding sectional portion of Figure 2. Figure 5 shows in detail a portion of the strap (10) which is used to attach the pans together.

This invention refers to baking pans which are preferably stamped or drawn in one piece without folds, seams, joints or other crevices or unions. The pans are preferably formed of tin plate although, of course, any desired material may be employed. Referring to the drawings more specifically (1) represents a typical pan which is drawn in a single piece without joints or folds. (2) represents an intermediate pan and (3) represents another end pan similar but opposite to pan (1).

It will be noted that pan (1) is formed with an integral deck or flange (4) which surrounds the pan on all sides. On the adjacent sides between two pans flange (4) is brought into contact with flange (5) of an adjacent pan. A connecting channel strip (6) is placed beneath the adjacent flanges (4) and (5) and interlocked and folded over the respective edges (7) and (8) or flanges (4) and (5). By means of this construction only a single joint (9) is left between adjacent pans and otherwise the entire top surface as well as the inside of the pans is smooth and free from cracks, joints, folds or other obstructions.

A strap (10) surrounds the entire set of pans and serves to hold the individual units into a solid reinforced set of unusual strength. The strap (10) is held in place by the expedient of rolling lugs (11) outwardly and downwardly together with the flange (4) of the pan in such a manner that the two form a rigid seam.

In constructing the pans and the strap, it is desirable to use a relatively heavy gauge material as the stiffness of the bent material is of great value in holding the sets together.

Either a single strap extending entirely around the group of pans and riveted upon itself by lap (12) as shown in Figure 3 or four individual straps may be used by providing one strap for each of the long sides of the set and a strap for the short sides, attaching the four straps together at their four adjacent points by overlapped tongues similar to that shown as reference (12) in Figure 3.

It will be evident that after rolling and seaming the flanges of the pan into the extensions (11) of the strap that the joint should be firmly pressed in order to secure the maximum rigidity.

It will be apparent that such a construction makes an interlock which without any further riveting or fastening firmly and permanently holds the strap and pan into a single unit. The channel shaped portions of both flange and strap which result from this construction give great rigidity and a degree of strength not obtainable with a single strap unless an excessively heavy one is employed.

It will also be apparent that any number of pans may be attached together in a set, three pans being selected merely for purposes of illustration.

Many other obvious changes may be made from the arrangement shown and described without departing from the spirit of this invention. Some of such changes are the material from which the pans are made, the shape and proportions of the pans, etc.

Having now fully described my invention what I claim as new and wish to secure by Letters Patent in the United States is as follows:

1. A set of baking pans consisting of a number of drawn seamless units provided with flanges on all four edges, adjacent flanges of adjacent pans being attached together to form a joint, a strap member extending along the series of pans, and contacting with at least two ends of each pan, an attachment between said pans and said strap member consisting of a double rolled joint between the flange of one of said pans and the upper portion of said strap member, said adjacent flanges being at their ends also rolled with said strap and serving to cover the upper portion of said strap at all points except at the corners of the set.

2. In a multiple set of drawn seamless baking pans a strap member extending along the sides of several pans of said set and contacting with at least two ends of each pan, flanges on said pans, and a joint between said flange of said pan and said strap said joint consisting of a double fold of the material on both the pan and the strap, said strap member abutting the ends of the pans and at its upper edge substantially continuously surrounded by said flange at all points, except the corners of the set.

3. A series of drawn baking pans arranged side by side and partially surrounded by a strapping member, said strapping member making contact with at least two ends of each pan, flanges on said pans, and a joint between said flanges and said strapping member, said joint being formed by interlocking a downwardly bent portion of said strapping member with the downwardly bent flange of each of said pans said strapping member being at its upper edge entirely inclosed by the flange and pan of the set except at the corner of the set.

4. A series of drawn baking pans having flanges on their upper portions, a strap extending along the ends of said pans, said strap making contact with two ends of each pan, a joint between the adjacent flanges of adjacent pans, and a joint between the flanges of said pans and said strap so arranged that said flange surrounds and interlocks a downwardly bent portion of said strap and said strap being at its upper edge entirely inclosed by the flange and sides of said pan except at the corners of the set.

ARTHUR KATZINGER.